United States Patent [19]

Ferris et al.

[11] 4,242,047
[45] Dec. 30, 1980

[54] ADJUSTABLE BEARING CENTERING MEANS FOR HELICOPTER ROTOR ELASTOMERIC BEARINGS

[75] Inventors: Donald L. Ferris, Newtown; Peter C. Ogle, Woodbridge, both of Conn.

[73] Assignee: United Technologies Corporation, Hartford, Conn.

[21] Appl. No.: 35,365

[22] Filed: May 2, 1979

[51] Int. Cl.³ .................................................. B64C 27/38
[52] U.S. Cl. .................................. 416/134 A; 416/141
[58] Field of Search ............................. 416/134 A, 141

[56] References Cited

U.S. PATENT DOCUMENTS

| | | | |
|---|---|---|---|
| 3,501,250 | 3/1970 | Mosinskis | 416/140 |
| 3,759,631 | 9/1973 | Rybicki | 416/134 A |
| 3,761,199 | 9/1973 | Ferris et al. | 416/134 A |
| 3,764,230 | 10/1973 | Rybicki et al. | 416/134 A |
| 3,778,189 | 12/1973 | Ferris | 416/140 |
| 3,853,426 | 12/1974 | Rybicki | 416/140 |
| 3,967,918 | 7/1976 | Mouille et al. | 416/141 |
| 4,028,001 | 6/1977 | Watson | 416/134 A |

*Primary Examiner*—Everette A. Powell, Jr.
*Attorney, Agent, or Firm*—Vernon F. Hauschild

[57] ABSTRACT

Apparatus to center and compressively load a spherical elastomeric bearing about its static apex during helicopter rotor static mode, which centering means is adjustable from a station external of the rotor and is operable to be out of contact during helicopter rotor dynamic mode.

4 Claims, 6 Drawing Figures

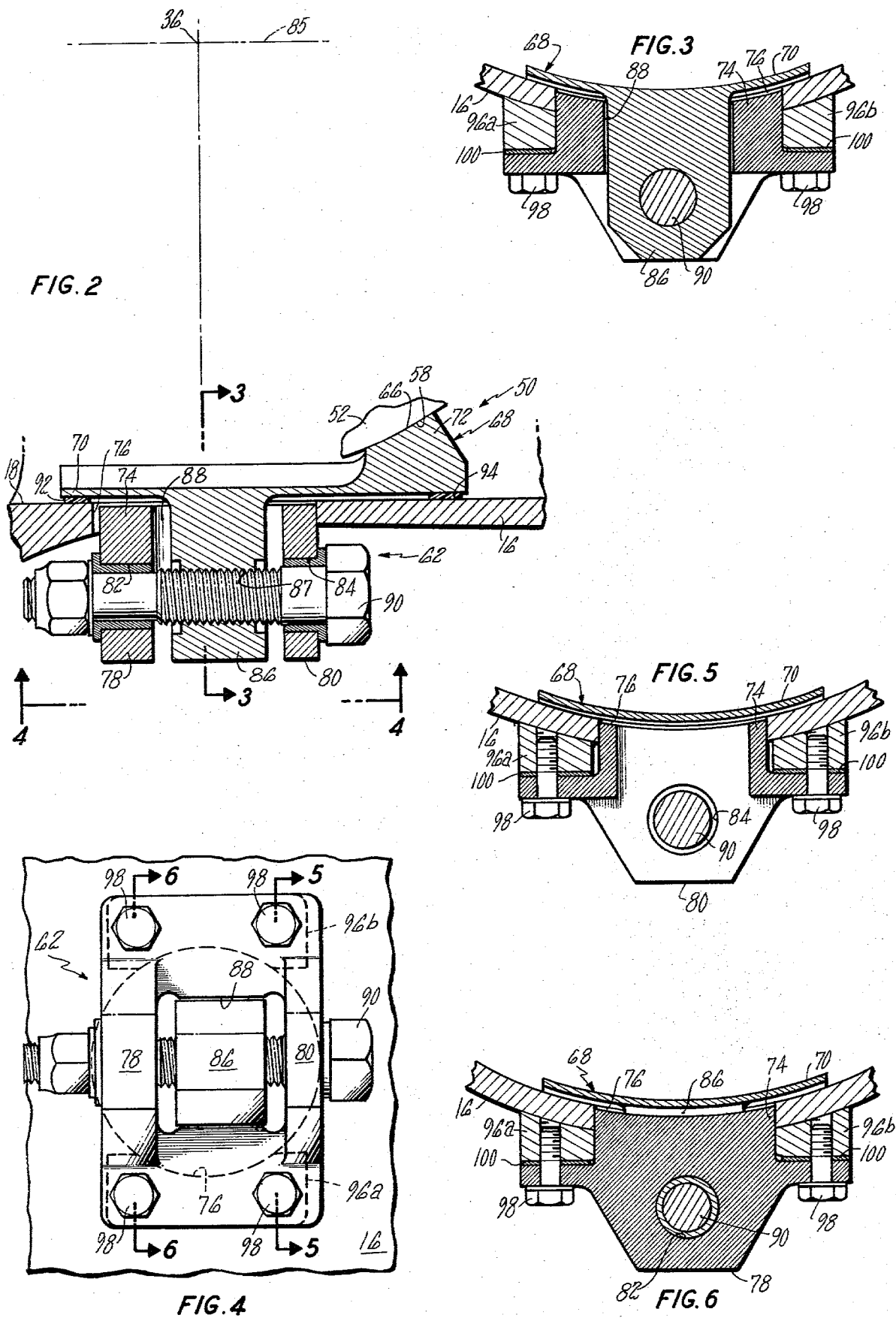

ADJUSTABLE BEARING CENTERING MEANS FOR HELICOPTER ROTOR ELASTOMERIC BEARINGS

The invention herein described was made in the course of or under a contract or sub-contract thereunder, with the Department of the Navy.

BACKGROUND OF THE INVENTION

1. Field of Invention

This invention relates to helicopter rotors utilizing segmented spherical elastomeric bearings to support the blade from the hub and includes a centering bearing adjustable external of the rotor to position and compressively load the spherical elastomeric bearing during helicopter rotor static mode and operable to be out of contact during helicopter rotor dynamic mode.

2. Description of the Prior Art

Previously configured elastomeric rotor systems have elastomeric centering bearings located at the apex of the spherical elastomeric bearing which positioned the apex of said bearing both statically and dynamically. These prior art centering bearings are not usable in a rotor system where the pitch cylindrical elastomeric bearings are located and operative in series with the flap/lead-lag spherical elastomeric bearings, and a spindle passes through an aperture in the center of said bearings. There prior art bearings are shown in U.S. Pat. No. 3,700,352.

SUMMARY OF THE INVENTION

A primary object of the present invention is to provide apparatus for centering the spherical elastomeric bearing of an elastomeric helicopter rotor head so that during helicopter rotor static mode the spherical elastomeric bearing is fixedly held in position about its static apex, and preferably compressively loaded, and such that the centering apparatus is not in contact during helicopter rotor dynamic mode.

It is a further object of the present invention to teach such an elastomeric bearing centering apparatus which will eliminate tensile loading of the spherical elastomeric bearing when the blade rests against the static droop stop, when the blades are being folded or are folded and bear against the anti-flap stop, and when the blades are spread when the aircraft is on the ground and the blades are subject to wind gust loading, causing a coupling of the blade loads about these stops and the static apex point of the spherical elastomeric bearing.

It is a further object of this invention to teach such a centering apparatus in which the static apex point of the spherical elastomeric bearing is held in fixed position when the blade and its loads are coupled about this static apex point, and the blade is on the static droop stop, when the blade is on the anti-flap stop during blade folding, and when the blade is on a dynamic stop in case of damage or malfunction of the static droop stop when the aircraft is on the ground.

It is still a further object of this invention to teach such a bearing centering means in which no pitch motion is introduced to the centering bearing when pitch control is introduced to the blade on the ground.

It is a very important teaching of this invention that the centering bearing can be accurately adjusted external of the rotor hub so as to minimize the deflection of the spherical bearing static apex position regardless of discrepancies or tolerances of the apex point, hub bearing or the droop stop position and which is also capable of compensating for elastomeric bearing wear and set.

It is still a further object to teach such a bearing centering system in which the centering bearing reacts the rotor brake loads on the spherical flap/lead-lag elastomeric bearing only.

Other objects and advantages of the present invention may be seen by referring to the following description and claims, read in conjunction with the accompanying drawings.

BRIEF DESCRIPTION OF THE DRAWINGS

FIG. 2 is a cross-sectional showing of one of the adjustable centering socket means.

FIG. 3 is a showing along section line 3—3 of FIG. 2.

FIG. 4 is a view along section line 4—4 of FIG. 2.

FIG. 5 is a view along section line 5—5 of FIG. 4.

FIG. 6 is a view along section line 6—6 of FIG. 4.

DESCRIPTION OF THE PREFERRED EMBODIMENT

Figure 1:
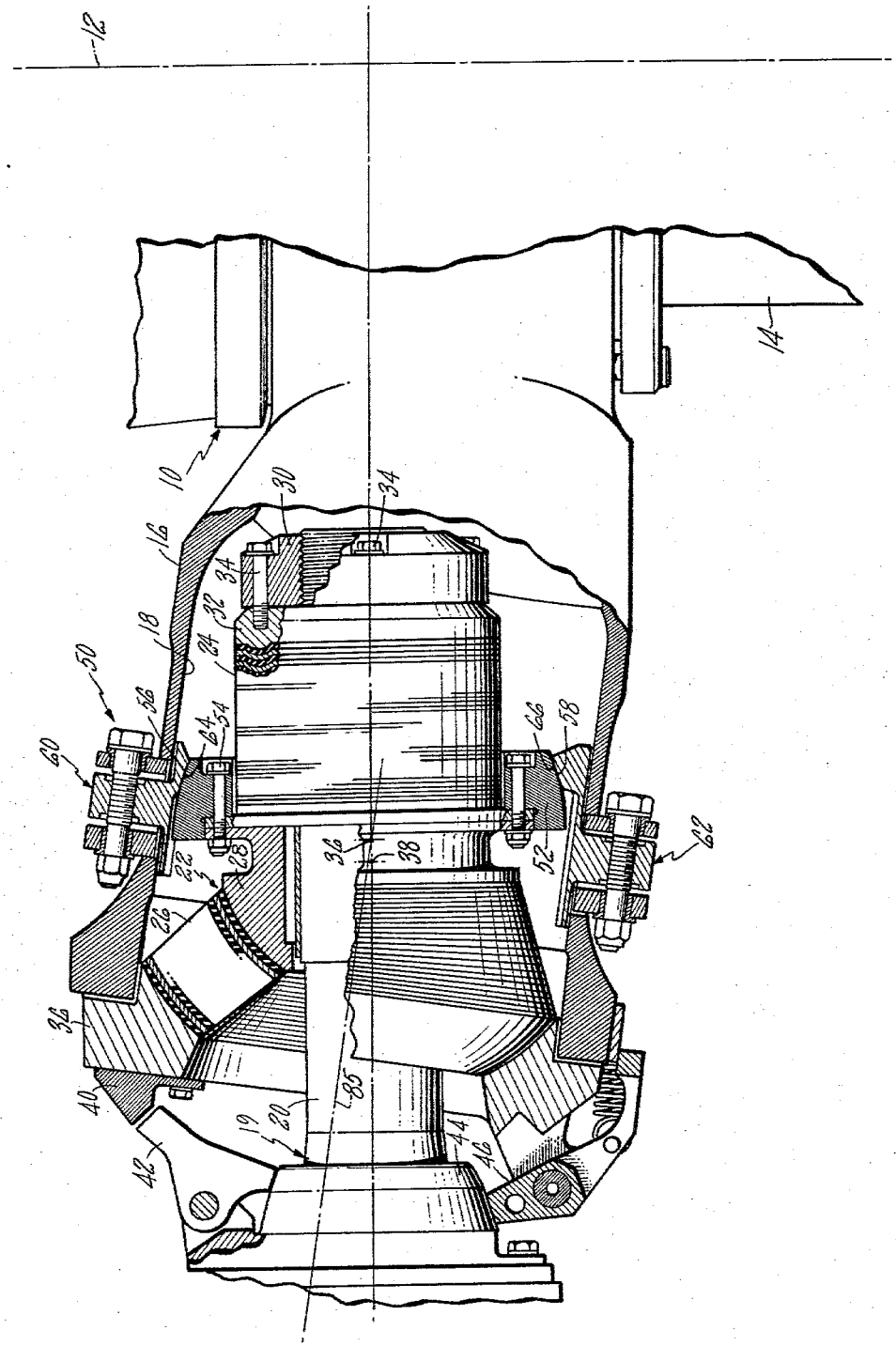
FIG. 1 is a partial cross-sectional showing of a helicopter rotor in which the blade is supported from the hub through elastomeric bearings and showing our elastomeric bearing centering apparatus in its environment.

Referring to FIG. 1 we see helicopter rotor 10 mounted for rotation about axis of rotation 12 and driven by drive shaft 14. Each blade of the rotor is supported from a hub arm 16, which projects substantially radially from the rotor hub and is connected thereto in conventional fashion. The rotor hub includes a central bore 18, which is substantially cylindrical. Each blade 19 has at its radially inner end spindle 20, which extends into central bore 18 of hub arm 16 and which is connected to the hub arm through elastomeric bearing means 22 so that each blade is supported from hub arm 16 and hence rotor 10 by elastomeric bearing system 22. Elastomeric bearing system 22 includes cylindrical pitch bearing 24 and spherical flap/lead-lag bearing 26. Bearings 24 and 26 are elastomeric bearings comprising alternate layers of elastomer and rigid material. Bearings 24 and 26 are connected through connecting ring 28, while the radial inner end of spindle 20 is connected to the radial inner end of pitch elastomeric bearing 24 by spindle nut 30, which threadably engages the inner end of spindle 20 and is connected in turn to pitch bearing race 32 by conventional connecting bolts 34. The outer end of spherical, flap/lead-lag elastomeric bearing 26 is connected to end plate 36, which is in turn connected in conventional fashion to the radially outer end of hub arm 16. In this fashion, the blade is supported from hub arm 16 through elastomeric bearing system 22 in such a fashion that cylindrical elastomeric bearing 24 accommodates pitch change motion between the blade and the hub arm, while spherical elastomeric bearing 26 accommodates flap and lead-lag motion between the blade and the hub arm. Spherical bearing 26 is shaped to be concentric about static apex or pivot point 36 during static mode of rotor 10 and about dynamic apex or pivot point 38 during dynamic mode of rotor 10, at which time the centrifugal loads imposed upon the elastomeric bearings by the rotating blade 19 cause the elastomeric bearing to compress and therefore cause spherical bearing apex to shift from static apex 36 to dynamic apex 38. Elastomeric bearing system 22 may be of the type more fully described in U.S. Pat. Nos. 3,759,631 and 3,764,230.

Still viewing FIG. 1, we see that blade anti-flap stop 40 is positioned from bearing end plate 36 and cooperates with pivotal anti-flap member 42 to limit the amount of blade flapping during dynamic mode, which is the anti-flap mechanism position shown in FIG. 1. In conventional fashion, member 42 pivots out of alignment with stop 40 during dynamic mode of rotor 10 so as to permit a greater amount of blade flapping. Similarly, blade spindle 20 carries droop stop ring 44, which cooperates with pivotable droop stop 46 to limit the amount of blade droop during rotor static mode. As illustrated in FIG. 1, droop stop 46 pivots in response to centrifugal force to provide a greater amount of droop during dynamic operation of rotor 10. The construction and operation of the anti-flap mechanism 40-42 and the droop stop mechanism 44-46 is more fully described in U.S. Pat. No. 3,853,426 and Patent Application Ser. No. 919,357 entitled Elastomeric Helicopter Load Reaction System and filed June 26, 1978 in the name of Donald L. Ferris et al.

It will be noted by viewing FIG. 1 that when the blade is resting against droop stop 46, the blade and its loads are coupled about static apex point 36, tending to displace this point in an upward direction putting the upper layers of elastomer of bearing 26 in compression, and the lower layers of elastomer of this bearing in tension. When the anti-flap stop is operative due to wind loads, or a folded condition of the blade, the static apex point 36 tends to displace in a downward direction putting the upper layers of elastomer of bearing 26 in tension and the lower layers in compression. Elastomeric bearings are not capable of withstanding tension loading and it is important that provisions be made to prevent tension loading thereof.

To prevent tension loading of spherical elastomeric bearing 26 due to any cause, including the coupling of the blade and its loads about the droop stop and the anti-flap stop just described, centering bearing mechanism 50 is provided. Centering bearing mechanism 50 includes centering ring 52, which is supported by conventional bolt means 54 from bearing connecting means 28 so that its spherical outer surfaces 56 and 58 are coincident with elastomeric bearing 26 static apex 36. Centering bearing mechanism 50 also includes top centering bracket 60 and bottom centering bracket 62 which are adjustable as described hereinafter so that they present spherical surfaces 64 and 66 identical to and which matingly engage spherical surfaces 56 and 58 of centering ring 52 and which are also coincident with spherical bearing 26 static apex 36. The spherical surfaces 56 and 58 of centering ring 52 are circumferentially spaced so as to be in alignment with their mating spherical surfaces 64 and 66 of top and bottom centering sockets 60 and 62. Bracket members 60 and 62 have slightly different interior surface shape as shown in FIG. 1 because hub arm axis 85 is angularly displaced from the axis of blade 19 when the blade is resting against droop stop 46 or anti-flap stop 40.

Centering bearing mechanism 50 will be more fully understood by considering FIGS. 2 through 6. As shown in FIG. 1, centering bracket assemblies 60 and 62 are located on diametrically opposite sides of hub arm 16 and, since they are identical for the purposes of this invention, only the lower centering bracket assembly 62 will be described in detail. Centering bracket assembly 62 includes bracket member 68, which is fabricated to have cylindrical portions 70 which bears against the inner bore 18 of hub arm 16 so as to be slideable therealong, and further to have spherical surface defining portion 72, which defines spherical surface 66 equal in size to spherical surface 58 of centering bearing 50 and coincident with the static apex 36 of spherical elastomeric bearing 26 when engaged with surface 58. Cylindrical plug 74 extends through cylindrical aperture 76 in the wall of spherical hub arm 16 and has radially space lug members 78 and 80 projecting outwardly therefrom and having bearinged aligned apertures 82 and 84 therein extending parallel to the hub arm axis 85, which is parallel to central bore 18. Bracket member 68 also includes outwardly extending lug 86, which extends radially outwardly through aperture 88 in plug 74. Lug 86 has threaded aperture 87 therein, which aligns with bearinged apertures 82 and 84 of plug lugs 78 and 80 parallel to hub arm axis 85. Adjusting screw or bolt 90 extends through bearinged apertures 82 and 84 and threadably engages aperture 87 so that the turning of adjusting screw 90 causes bracket member 68, and hence its spherical surface 66 to move along the inner bore 18 of hub arm 16 to thereby adjust the position of spherical surface 66 with respect to the position of the spherical surface 58 of centering ring 52. Preferably, spherical surface 66 is coated with a Teflon or other anti-friction fabric as are the outer surfaces of bracket 68 at annular stations 92 and 94 so as to reduce friction. As best shown in FIGS. 3-6, split clamping plate sections 96a and 96b are positioned on opposite sides of plug 74 and bear against outer surface of hub arm 16. With adjusting screw or bolt 90 installed in bearinged apertures 82 and 84 and threadably engaged in aperture 87, selectively dimensioned shim members 100 are positioned between clamping plate members 96a and 96b and plug member 74 so that cylindrical portion 70 of bracket member 68 fits tightly but slideably with inner bore 18 of hub arm 16. Screw members such as 98 then permanently join plug member 74, clamping plate members 96a and 96b and shim members 100.

In the blade installation process, with the blades removed, adjusting screw 90 is turned so as to move socket 68 inboard within the hub arm as far as slotted aperture 88 will permit. Spindle 20 and centering ring 52 are mounted to the hub arm 16 through elastomeric bearing assembly 22. In this position, the spindle axis and the hub arm axis are coincident, and the spherical flap/lead-lag bearing 26 is unloaded or neutral with respect to the strain of the elastomer. The top and bottom adjusting screws 90 of centering socket assemblies 60 and 62 are then advanced outboard until a sharp increase in torque indicates that the spherical surfaces 64 and 66 of the sockets 60 and 62 are bearing against the spherical surfaces 56 and 58 of the centering ring 52, thus placing spherical bearing 26 in compressive loading and centering the static pivot point so that when blades are installed and coupling occurs about either the droop or anti-flap stops during static operation of rotor 10, no tension loading in the spherical flap/lead-lag bearing 26 will occur. The centrifugal force of the blade will cause bearings 26 and 24 to compress, thereby moving centering ring 52 and spherical surfaces 56 and 58 away from the spherical surfaces 64 and 66 of the centering sockets 60 and 62 so that there is no wearing between these surfaces during helicopter rotor dynamic operation.

It will therefore be seen that our centering apparatus 50 fixedly positions spherical elastomeric bearing 26 about its static apex or pivot point 36 during static mode of rotor 10, and places that bearing in compressive loading and protects it from any type of tension loading which would be caused by coupling effects of droop or flap stop contact or the like. Further, the centering mechanism disengages during dynamic operation of rotor 10 to prevent friction wear of the associated parts. Further, and most importantly, our centering mechanism 50 can be adjusted from a station external of the rotor to establish the required contact between the socket spherical surfaces 64 and 66 and the centering ring spherical surfaces 56 and 58 so as to compensate for any type of tolerance, misalignment or wear and may be further adjusted to allow for any progressive set of the elastomeric bearing 26.

It will be noted that with the rotor in FIG. 1 static mode, pitch change motion of blade 19 and spindle 20 will be accommodated fully by cylindrical elastomeric bearing 24 so that centering bearing 50 is unaffected thereby.

We wish it to be understood that we do not desire to be limited to the exact details of construction shown and described, for obvious modifications will occur to a person skilled in the art.

We claim:

1. A helicopter rotor having a hub member rotatable about an axis of rotation and at least one hub arm extending radially therefrom for rotation therewith and said hub arm having a substantially radially extending cylindrical bore therewithin,
   (A) a blade member extending substantially radially from said hub member and including a spindle at its radial inner end extending into said hub arm bore,
   (B) elastomeric bearing means connecting said spindle to said hub arm so as to support said blade from said hub arm and so that blade centrifugal force generated during rotor rotation will impart compressive loading on said elastomeric bearing means,
   (C) said elastomeric bearing means including a cylindrical elastomeric bearing joined to said spindle at its radial inner end and a spherical elastomeric bearing having a static apex and being joined to said hub arm at its radial outer end,
   (D) connecting means joining said cylindrical and said spherical elastomeric bearings so that said bearings join said spindle to said hub arm so that the elastomeric bearings operate in series,
   (E) means for centering said elastomeric bearing means within said hub arm bore comprising a centering ring connected to said elastomeric bearing connecting means and having at least two spherical surfaces at the outer periphery thereof coincident with said spherical elastomeric bearing static apex, centering socket means positioned within and connected to said hub arm bore and including at least two spherical bearing portions coincident with said spherical elastomeric bearing static apex and adapt to matingly engage the centering ring spherical surface so as to center said spherical elastomeric bearing about its static apex when said rotor is in static mode.

2. A helicopter rotor according to claim 1 and including means to adjustably position said centering socket means with respect to said centering ring so that their spherical surfaces are brought into mating engagement and hence spherical elastomeric bearing is fixed in position about its static apex when said rotor is in static mode, and so that said centering ring moves radially outwardly with the elastomeric bearing means and away from said centering socket means in response to centrifugal loading of said elastomeric bearing means by said blade during rotor dynamic mode.

3. A helicopter rotor according to claim 2 wherein said centering ring is a continuous ring having spherical surfaces at circumferentially spaced locations thereabout, and further wherein said centering socket means are positioned to have its said spherical surfaces similarly circumferentially spaced about the hub arm bore so as to matingly engage the centering ring spherical surfaces.

4. A helicopter rotor according to claim 3 wherein said hub arm has diametrically opposed cylindrical apertures extending through the wall thereof, and wherein said centering socket means includes a centering socket member at each of said apertures comprising:
   (A) a cylindrical plug member extending through said hub arm aperture so as to be substantially flush with the hub arm bore and having radially spaced lug members extending outwardly therefrom, and having aligned apertures extending therethrough, and further having an aperture in said plug member between said lug members,
   (B) centering socket having a substantially cylindrical portion shaped to matingly engage said hub arm bore and further shaped to define one of said centering socket means spherical surfaces, and further having a lug member extending outwardly therefrom through said lug arm wall aperture and said plug member aperture and positioned between said plug lugs and having a threaded aperture extending therethrough so as to be in alignment with said plug lug apertures, means to position said plug member with respect to said hub arm so that said centering socket cylindrical portion bears against the hub arm bore, and
   (C) an adjusting screw extending through said aligned apertures of said plug lug member and said centering socket lug member so as to selectively position said centering socket and hence said centering socket means cylindrical surfaces with respect to said centering ring cylindrical surfaces so as to apply a compressive load on said spherical elastomeric bearing in static mode.

* * * * *